US011165990B2

(12) United States Patent
Ferrari (10) Patent No.: US 11,165,990 B2
(45) Date of Patent: Nov. 2, 2021

(54) MOBILE TERMINAL AND HUB APPARATUS FOR USE IN A VIDEO COMMUNICATION SYSTEM (71) Applicant: Huddle Room Technology S.R.L., Campogalliano (IT)

(72) Inventor: Mario Ferrari, Campogalliano (IT)

(73) Assignee: Huddle Room Technology S.R.L., Campogalliano (IT)

( * ) Notice: Subject to any disclaimer, the term of this patent is extended or adjusted under 35 U.S.C. 154(b) by 0 days.

(21) Appl. No.: 16/955,846

(22) PCT Filed: Dec. 19, 2018

(86) PCT No.: PCT/EP2018/085823
§ 371 (c)(1),
(2) Date: Jun. 19, 2020

(87) PCT Pub. No.: WO2019/121901
PCT Pub. Date: Jun. 27, 2019

(65) Prior Publication Data
US 2020/0396420 A1    Dec. 17, 2020

(30) Foreign Application Priority Data

Dec. 20, 2017  (IT) .......................... 102017000147590

(51) Int. Cl.
*H04N 7/15* (2006.01)
*H04W 76/10* (2018.01)
(Continued)

(52) U.S. Cl.
CPC .............. *H04N 7/15* (2013.01); *G10L 17/04* (2013.01); *G10L 17/06* (2013.01); *H04W 76/10* (2018.02); *H04W 88/02* (2013.01)

(58) Field of Classification Search
CPC combination set(s) only.
See application file for complete search history.

(56) References Cited

U.S. PATENT DOCUMENTS 9,554,091 B1    1/2017  Malegaonkar et al.
2009/0310763 A1*  12/2009  Chambers ............. H04M 3/385
                                                    379/114.14
(Continued)

FOREIGN PATENT DOCUMENTS

EP    2677743 A1    12/2013

OTHER PUBLICATIONS

International Preliminary Report on Patentability for International Application No. PCT/EP2018/085823 dated Jul. 2, 2020.
(Continued)

*Primary Examiner* — Phung-Hoang J Nguyen (57)    ABSTRACT

A hub apparatus (20) is designated to be used in a video communication system comprising the hub apparatus (20) and a plurality of mobile terminals (10a-10d) configured to be wirelessly connectable to the hub apparatus (20). The hub apparatus (20) comprises: a receiving unit (24) configured to receive from each mobile terminal (10) of the plurality of mobile terminals (10a-10d) a video stream, a current speaker indicator to indicate whether the user of the mobile terminal is speaking and an association information which associates the current speaker indicator transmitted by the mobile terminal with the video stream transmitted from such mobile terminal (10), and a generation unit (40) operatively connected to said receiving unit (24) and configured to generate an output video communication stream (6) based on the plurality of video streams received from each mobile terminal (10) of the plurality of mobile terminals (10a-10d), on the plurality of current speaker indicators received from each mobile terminal (10) of the plurality of mobile terminals (10a-10d) and on the plurality of association information received from each mobile terminal (10) of the plurality of mobile terminals (10a-10d).

12 Claims, 7 Drawing Sheets

(51) Int. Cl.
*G10L 17/04* (2013.01)
*G10L 17/06* (2013.01)
*H04W 88/02* (2009.01)

(56) References Cited

U.S. PATENT DOCUMENTS

| | | |
|---|---|---|
| 2010/0309284 A1* | 12/2010 | Samadani ........ H04N 21/42203 |
| | | 348/14.08 |
| 2011/0157299 A1 | 6/2011 | Lee et al. |
| 2013/0106976 A1 | 5/2013 | Chu et al. |
| 2014/0371955 A1* | 12/2014 | Vaghefinazari .... G01C 21/3664 |
| | | 701/2 |
| 2015/0110259 A1 | 4/2015 | Kaye et al. |
| 2016/0284354 A1 | 9/2016 | Chen et al. |

OTHER PUBLICATIONS

International Search Report and Written Opinion for International Application No. PCT/EP2018/085823 dated Feb. 18, 2019.
Italian Search Report dated Aug. 24, 2018 and English translation thereof for Italian Application No. 102017000147590.

* cited by examiner

MOBILE TERMINAL AND HUB APPARATUS FOR USE IN A VIDEO COMMUNICATION SYSTEM

CROSS REFERENCE TO RELATED APPLICATIONS

This Application is a national stage filing under 35 U.S.C. 371 of International Patent Application Serial No. PCT/EP2018/085823, filed Dec. 19, 2018, entitled "MOBILE TERMINAL AND HUB APPARATUS FOR USE IN A VIDEO COMMUNICATION SYSTEM". Foreign priority benefits are claimed under 35 U.S.C. § 119(a)-(d) or 35 U.S.C. § 365(b) of Italian application number 102017000147590, filed Dec. 20, 2017. The entire contents of these applications are incorporated herein by reference in their entirety.

FIELD OF THE INVENTION

The present invention regards a mobile terminal and a hub apparatus for use in a video communication system.

TECHNICAL BACKGROUND

The so-called "endpoint" or "room" or "group" apparatus designated for video conferences with multiple communicating parties simultaneously present in meeting rooms and the like are known.

Generally, the known apparatuses are provided with a video camera, one or more screens, microphones and loudspeakers and they are mounted by designated operators in environments they are required to serve. However, such known apparatus are generally very expensive and poorly flexible, in that they are not easily and quickly adaptable to the various needs of the users.

Alternatively, to this type of apparatus, the use of systems of the "desktop" type consisting of a PC, a monitor, loudspeakers, a webcam, a microphone and, obviously, a video conference software is known. This type of apparatus is very economic and rather effective should the user want to take part in a video conference, for example, from his own desk, but it does not effectively meet the need of a video conference in a room with multiple participants.

As a matter of fact, in case of use in a meeting room, the PC is generally connected to a television, arranged at one end of the meeting room, and on which a webcam is engaged. Commonly, the microphone is connected to the PC and positioned above a table of the meeting room. Due to the limited shooting angle of the webcam, which at maximum reaches 90°, it is easily understandable that the aforementioned solution considerably jeopardises the effectiveness of the video conference, in that either most of the people taking part cannot be seen clearly due to the excessive distance from the webcam or, are not even captured by the webcam and, thus, only their voice can be heard.

Also known are systems that use the video cameras of the mobile terminals (e.g. smartphones) of the users as peripherals for capturing the video images; in this type of systems, the videos taken by the mobile terminals are sent to a hub apparatus which sends the captured images to a remote terminal taking part in the video conference.

In these systems in which a plurality of users take part in the conference at an "endpoint", there arises the problem of identifying which user is speaking at a given time, so as to highlight the speaker in the video that is sent to the remote terminal.

Techniques for identifying the speaker by analysing the video and, in particular, the video portion regarding the mouth of the participants in the conference, so as to analyse the movement of the lips and identify the speaker. However, this technique is not always reliable given that the users can move the lips and speak in a low voice, without necessarily intending to orally take part in the video conference. Furthermore, this technique requires processing video images that are particularly complex thus requiring a high processing resource during the entire duration of the conference.

SUMMARY OF THE INVENTION

In light of the problems outlined above, the present invention has the object of providing an economic video communication system which makes it possible to identify the speaker effectively and reliably, and by means of which several users can comfortably take part in the video conference.

This object is achieved by means of the mobile terminal, the hub apparatus and a communication system according to the present invention, particularly the object of the invention is achieved by the appended claims the content of which is incorporated in the description by reference According to an aspect of the invention, in particular, provided is a mobile terminal designated to be used in a video communication system comprising a hub apparatus and a plurality of mobile terminals configured to be wirelessly connectable to the hub apparatus, the mobile terminal comprising:

a video acquisition unit configured to generate an input video signal, an audio acquisition unit configured to generate an input audio signal, a transmission unit configured to transmit to the hub apparatus a video stream generated starting from the input video signal generated by the video acquisition unit. The mobile terminal further comprises:

a storage (memory) configured to store a voice timbre pattern model of a user of the mobile terminal, a processing unit configured to generate a current speaker indicator indicating whether the user of the mobile terminal is speaking, the current speaker indicator being generated based on the input audio signal generated by the acquisition unit and the voice timbre pattern model stored in the storage of the mobile terminal, wherein the transmission unit is configured to transmit, to the hub apparatus, the current speaker indicator and an association information which associates the current speaker indicator to the video stream, while transmitting the video stream.

According to a further aspect of the invention, provided is a mobile terminal designated to be used in a video communication system comprising a hub apparatus and a plurality of mobile terminals configured to be wirelessly connectable to the hub apparatus, the mobile terminal comprising:

a receiving unit configured to receive from each mobile terminal of the plurality of mobile terminals a video stream, a current speaker indicator to indicate whether the user of the mobile terminal is speaking and an association information which associates the current speaker indicator transmitted by the mobile terminal with the video stream transmitted from such mobile terminal, and a generation unit operatively connected to said receiving unit and configured to generate an output video communication stream based on the plurality of video streams received from each mobile terminal of the plurality of mobile terminals, on the plurality of current speaker indicators received from each mobile terminal of the plurality of mobile terminals and on the plurality of association information.

By using the aforementioned mobile terminal, it is possible to effectively identify the speaker in a video conference based on recognition of the voice timbre. In particular, the mobile terminal according to the invention is advantageous in cases where various mobile terminals are used in the same room with video camera function. In this case, when the input audio does not correspond to that of the respective user, each mobile terminal generates a current speaker indicator which reflects the non-correspondence. Thus, even when various mobile terminals acquire the same audio, the current speaker indication is provided correctly to the hub apparatus, given that the mobile terminal indicates that the user thereof is speaking only upon recognising the voice timbre stored in the terminal.

Furthermore, by using the aforementioned hub apparatus, it is possible to generate a single video stream, for example to be sent to a remote terminal taking part in the video conference, wherein the speaker is effectively, reliably and efficiently highlighted with respect to the other participants.

According to a further aspect of the invention, the transmission unit of the mobile terminal is configured to establish a wireless connection with the hub apparatus, where the video stream and the current speaker indicator are transmitted to the hub apparatus by means of said wireless connection.

The use of a wireless connection offers a simple and practical method for sending the video stream to the hub apparatus. Furthermore, thanks to the presence of the wireless connection, association between the video stream and the speaker identifier can be advantageously obtained by means of connection identifiers (such as for example the connection "source port" and "destination port"), thus further simplifying the structure of the system and reducing the overhead in the wireless transmission.

According to a further aspect of the invention, the processing unit of the mobile terminal is configured to extract a voice timbre pattern model from the input audio signal generated by the acquisition unit and for calculating a correlation parameter between the extracted voice timbre pattern model and the voice timbre pattern model stored in the storage of the mobile terminal, wherein the current speaker indicator is generated based on the correlation parameter and it indicates the probability that the user of the mobile terminal is speaking.

Thus, the hub apparatus receives—as a speaker indicator—a correlation parameter generated by the mobile terminals and, hence, it can easily compare the various current speaker indicators and identify the speaker based on the comparison. For example, the smallest or largest correlation parameter, between the plurality of received correlation parameters, could be identified as the one regarding the terminal of the current speaker.

According to yet another aspect of the invention, the processing unit of the mobile terminal is configured to repeatedly generate the current speaker indicator with a repetition period fixed or variable over time. By generating the current speaker indicator repeatedly over time, it is possible to provide up-to date information according to a pace corresponding to the needs of the system, allowing in particular, to significantly keep track of the current speaker as the conversation unfolds, and thus avoiding an excessive processing load to carry out timbre recognition.

According to yet another aspect of the present invention, the processing unit is configured to receive a timing signal from the hub apparatus including timing information. According to this aspect, the current speaker indicator is generated based on such timing information. Thus, the hub apparatus may actively control the pace at which the current speaker indicator is generated and subsequently sent, hence allowing to synchronise the generation of the speaker indicator among the plurality of mobile terminals taking part in the conference. This allows the hub apparatus to obtain speaker indicators relating to virtually coincident time instants, thus making speaker identification more effective and reliable. Furthermore, by varying the timing information, the hub can take into account, for example, of possible specific needs, though variable over time, of the system (including at least the hub apparatus and the plurality of mobile terminals) and thus optimising the timing for sending the information. For example, by adjusting the timing information it is possible to avoid overloading the processing units of the mobile terminals.

According to yet another aspect of the present invention, the hub apparatus includes a timing unit, configured to transmit a first timing signal to each of the mobile terminals of the plurality of mobile terminals providing information on the time span within which the transmission unit must transmit the current speaker indicator to the hub apparatus. Thus, the hub—similarly to the description above—may exercise an active control on the mobile terminals and synchronise the sending of the speaker indicators from the various mobile terminals.

According to yet another aspect of the present invention, the generation unit of the hub apparatus is configured to generate the output video communication stream based on the current speaker indicators received from each mobile terminal of the plurality of mobile terminals exclusively within a pre-established time window W and relative to the timing information included in the timing signal.

This allows preventing the generation of the single output video stream (for example consisting of a patchwork of images coming from the various mobile terminals) from being hindered by current speaker indicators not received or late-received, for example due to network issues or errors in the application executed by the mobile terminal. Thus, even in the case that not all current speaker indicators have not been timely received, the single output video stream is still generated and thus guaranteeing the overall reliability of the system.

According to yet another aspect of the invention, the generation unit of the hub is configured to select a video stream from among all video streams transmitted by the plurality of mobile terminals based on the plurality of current speaker indicators, wherein each of the current speaker indicators expresses the probability that the user of the respective mobile terminal is speaking. Furthermore, the generation unit is configured for generating a single output video stream comprising a patchwork of one or more video images each of which is generated using one of the video streams received from the mobile terminals, wherein the video image generated using the selected video stream is distinguished with respect to the other video images generated using the other video streams.

By selecting the video stream and making the video images associated thereto distinguishable, it is possible to make the participants of the video call/video conference readily aware of the current speaker. Thanks to the possibility of selecting the video stream and thanks to the possibility of distinguishing the speaker image, the usability of the system can thus be improved.

According to a further aspect of the invention, provided for is a video communication method implemented by a video communication system comprising a hub apparatus and a plurality of mobile terminals wirelessly connected to the hub apparatus, the method comprising the following steps carried out by each mobile terminal of the plurality of mobile terminals:

generating an input video signal, generating an input audio signal, transmitting—to the hub apparatus—an output video stream generated starting from the input video signal generated, storing a voice timbre pattern model of a user of the mobile terminal, generating a current speaker indicator indicating whether the user of the mobile terminal is speaking, the current speaker indicator being generated based on the generated input audio signal and the stored voice timbre pattern model, transmitting—to the hub apparatus—the current speaker indicator and transmitting an association information which associates the current speaker indicator to the video stream, while transmitting the video stream, the method further comprising the following steps carried out by the hub apparatus:

receiving, from each mobile terminal, a video stream and a current speaker indicator indicating whether the user of the mobile terminal is speaking and the association information, generating an output video communication stream based on the plurality of video streams received from each mobile terminal of the plurality of mobile terminals, on the plurality of current speaker indicators received from each mobile terminal of the plurality of mobile terminals and on the plurality of association information received from each mobile terminal of the plurality of mobile terminals.

Lastly, according to another aspect of the invention, it is possible to configure a video communication system comprising a mobile terminal according to any one of the aspects described above and a hub apparatus according to any one of the aspects described above.

As it will be apparent to the person skilled in the art, the aspects outlined above can be combined.

BRIEF DESCRIPTION OF THE DRAWINGS

The characteristics and advantages of the present invention will be illustrated with reference to an exemplifying embodiment of the invention described with reference to the attached drawings.

In the drawings.

DETAILED DESCRIPTION

Figure 1:
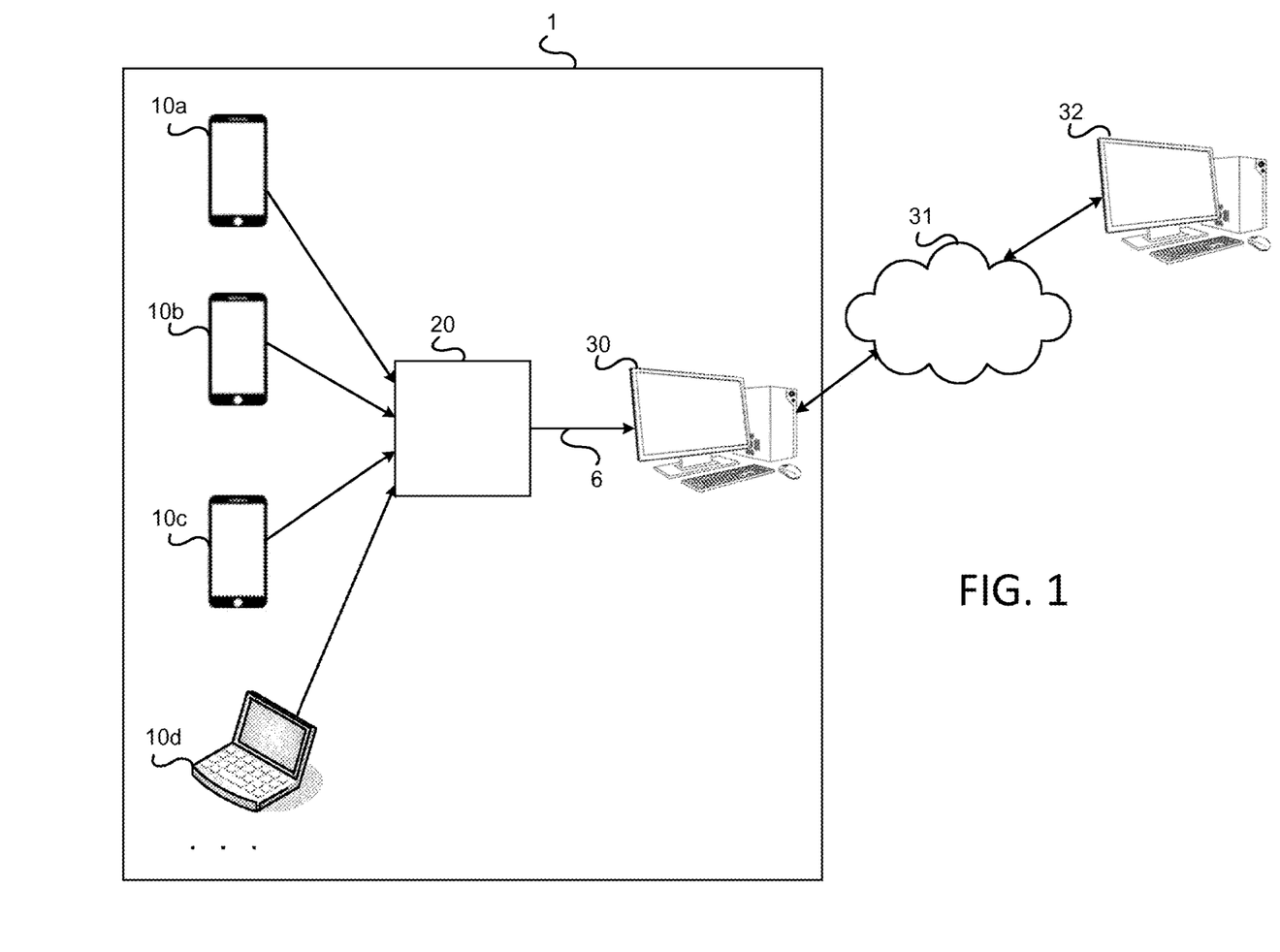
FIG. 1 schematically illustrates a video communication system according to an embodiment of the invention.

FIG. 1 shows a video conference system 1 comprising a hub apparatus 20, a plurality of mobile terminals 10a-10d and a processing device 30.

In a preferred embodiment, the hub apparatus 20 and the plurality of mobile terminals 10a-10d forming the video conference system 1 are located in the same room where the participants in a video conference, also involving a remote site, are gathered. The hub apparatus 20 and the plurality of mobile terminals 10a-10d are locally wirelessly connected.

In the example of the figure, the terminal 32 is located at the remote site and represents the remote terminal taking part in the video conference. The terminal 32 communicates with the terminal 30 by means of a network 31, for example an internet network and/or a mobile telephone network. The terminal 30 is in communication with the hub apparatus 20 and receives a single video signal 6 to be transferred to the remote terminal 32, as it will be described hereinafter. Advantageously, the terminal 30 is located in the same room as the hub apparatus 20 and the mobile terminals 10, forming an "endpoint" system 1. The terminal 30 may execute a video conference program (such as for example Skype™) so as to communicate with the remote terminal 32. The video signal transferred from the terminal 30 to the terminal 32 is advantageously a video signal 6 composed by the hub apparatus using the video signals gathered by the mobile terminals 10. In an embodiment, also the terminal 30 can be provided with video acquisition means and provide a video signal to the hub apparatus 20 to be inserted into the single composed video signal 6.

It should be observed that, in an alternative embodiment, the hub apparatus 20 and the plurality of mobile terminals 10 may also be arranged in different rooms and be connected to each other by means of a local network "access point", for example a wireless local network such as a WLAN. The processing device 30 could also be located in a different room with respect to the hub apparatus 20 and the mobile terminals 10.

The plurality of mobile terminals 10a-10d is wirelessly connected to the hub apparatus 20. In the example in FIG. 1 four mobile terminals 10a-10d are represented, but the number of mobile terminals could be different and vary between two and ten, for example. The mobile terminals 10 can be connected to the hub apparatus 20 for example by means of a wireless connection, in particular, for example, a Wi-Fi™ or Bluetooth® connection. In particular, the mobile terminal 10 may be connectable with the hub apparatus 20 by means of an IEEE 802.11 connection protocol, both directly and indirectly by means of an access point.

In this context, the adjective "connectable" is used to indicate the presence of a connection between the mobile terminal 10 and the hub apparatus 20 according to a specific communication protocol of the wireless connection type. Such connection is preferably provided with an identification modality, according to techniques known to the person skilled in the art. For example, the data transmitted from a mobile terminal 10 to the hub apparatus 20 is received through a port, and the identification of the port is univocally associated to all data transmitted by that specific mobile terminal 10 through the wireless connection established between the mobile terminal 10 and the hub apparatus 20. The port identification may for example be assigned in the step where the wireless connection is established, according to techniques known in the field of wireless connections.

As regards the present disclosure, the expression "mobile terminal" is used to identify user terminals, such as for example, laptops, notebooks, smartphones, tablets, mobile phones, etc, but without being limited by these examples. It should be observed that also the processing device 32 could be any among laptops, notebooks, smartphones, tablets, mobile phones.

More generally, according to the present disclosure, the mobile terminal 10 may represent a terminal employable by a user, capable of (or configurable for) accessing (or being connected to) a data exchange network and capable of executing a video calls and/or video conferences software, for example by means of a dedicated application, to carry out a communication with the hub apparatus 20.

Figure 2:
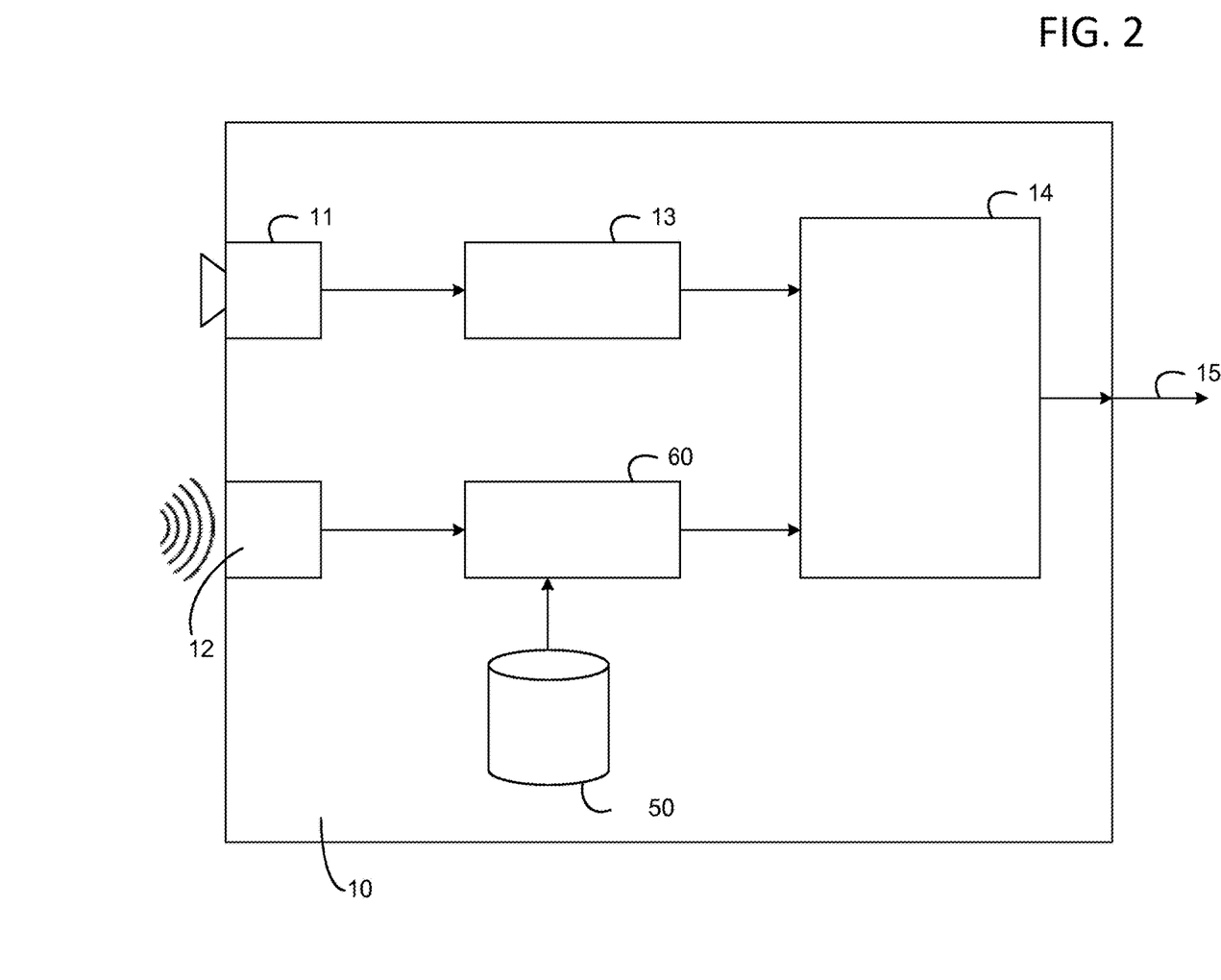
FIG. 2 illustrates a mobile terminal of the video communication system according to an embodiment of the invention.

With reference to FIG. 2, the mobile terminal 10 comprises a video acquisition unit 11 configured to generate an input video signal and an audio acquisition unit 12 configured for generating an input audio signal.

The mobile terminal 10 further comprises a processing unit 60 configured for outputting a current speaker indicator based on the input audio signal generated by the audio acquisition unit 12 and based on the content of a storage unit 50. The current speaker indicator provides an indication as to whether the user of the mobile terminal is speaking at a given time.

The current speaker indicator could occupy a relatively small data volume, such as for example a single byte (decimal values between 0 and 255), because it may preferably consist of a numerical value representing the probability that the user of the mobile terminal 10 is the current speaker.

Generally, the current speaker indicator indicates whether the user of a determined mobile terminal 10 is speaking or not. In other words, the current speaker indicator provides indications on the event (for example on the possibility) that a user is speaking.

The current speaker indicator can be generated, for example, by comparing the content of the storage 50 with the input audio signal generated by the audio acquisition unit 12 or with a signal extracted therefrom, such as for example a voice timbre pattern model. In this case, the current speaker indicator expresses a measure of the correlation between the content of the storage 50 (for example a voice timbre pattern model of the user of the mobile terminal) and the input audio signal, and it thus represents a correlation parameter.

For the purpose of the present disclosure the expression "model", with reference to the "voice timbre pattern model", shall be understood as including any type of information derived from the initial audio data or corresponding thereto. Creating a model may or may not entail data processing. Thus, the term "model" must be understood as including both a set of discrete values (obtained by means of sampling for example), and a mathematical function obtained through extrapolation or interpolation of initial data.

The storage 50 may include information regarding the voice timbre pattern model of the user of the mobile terminal 10.

The correlation parameter may indicate the possibility that the user of the mobile terminal 10 is currently speaking. Said possibility may be expressed as a percentages based on the correspondence level between the voice timbre stored in the storage 50 and the voice timbre extracted starting from the input audio signal and it may particularly be a probability.

For example, should the timbre extracted starting from the input audio signal be strongly similar to the timbre stored in the storage 50, the correlation parameter may have a relatively high value and in particular it may have a value close to 100%. Otherwise, i.e. should the timbre extracted starting from the input audio signal have a low or no similarity with the timbre stored in the storage 50, the correlation parameter may have a relatively low value and in particular it may have a value close to 0%.

The speaker indicator may consist of the correlation parameter described above. Alternatively, the speaker indicator could also be derived from the correlation parameter; for example, the speaker indicator could have a binary value, i.e. "1" or "0", to indicate that the user of the mobile terminal is speaking or is not speaking, where the binary value is obtained starting from the correlation parameter, for example by comparing it with a threshold value.

As regards the identification of the voice timbre, the processing unit 60 may use various technologies and types of algorithms. In particular, algorithms based on spectrum analysis may be used. The most common techniques used for carrying out analysis in this field are those based on Fast Fourier Transform (FFT). Algorithms deriving from the FFT algorithms are also well known.

As it will be immediately apparent to a person skilled in the art, other types of algorithms may also be used. For example, the aforementioned spectrum analysis may also make use of the so-called Spectral Descriptors, examples of which may be: "Bark band energies", "Mel band energies", "Mel-frequency cepstral coefficients (MFCC) of a frame" which are widely used in the field of music.

The voice timbre information included in the storage 50 may be collected in various manners, for example when using a dedicated application for the first time, or simultaneously with the use of an application for video calls and/or video conferences used for the sending the video stream to the hub apparatus 20. Furthermore, it may be possible that the information in the storage 50 be also updated upon request of the user of the mobile terminal 10. There are no particular limitations to collection method and subsequent storage of the information regarding the voice timbre in the storage 50, hence the methods above are to be merely understood as explanatory.

The transmission unit 14, included in the mobile terminal 10 is configured to send to the hub 20 a video stream received from a video stream generation unit 13 and for sending also the current speaker indicator by means of an output stream 15 (or an output signal). In an embodiment, the transmission unit 14 is also configured for sending to the hub 20 an audio stream received from an audio stream generation unit (not shown in the figure) by means of the output stream 15. In any case, the audio stream could also not be transmitted from the mobile terminal 10 to the hub apparatus 20; in this case, the hub apparatus could be provided with audio acquisition means, for providing the terminal 30 with the audio signal to be provided to the remote terminal 32.

The video stream generation unit 13 and the audio stream generation unit may apply any known type of coding and compression.

The video stream and the speaker indicator (for example, the correlation parameter) may be sent to the hub apparatus 20 using a same transmission channel or separately. Advantageously, the video stream and the speaker indicator are sent by using the same wireless connection between the mobile terminal 10 and the hub apparatus 20. For example, the speaker indicator associated to the video stream can be sent through a TCP or UDP data channel open between the mobile terminal 10 and the hub apparatus 20 through the wireless connection established between the mobile terminal 10 and the hub apparatus 20 (for example, a Wi-Fi or Bluetooth connection).

By using the same wireless connection to send the video stream and the speaker indicator, for example a TCP connection, it is possible to establish, through the channel itself, an immediate correspondence between a determined video stream and the respective current speaker indicator, using a connection identifier included in the packet headers sent through the connection. For example, in the case of the TCP connection, thanks to the "TCP header source port" (and/or "destination port") included in each data packet exchanged between the hub apparatus 20 and a mobile terminal 10, the hub apparatus 20 can establish a correspondence between a video stream and a speaker indicator.

The "source port" (and/or "destination port") as a matter of fact identifies the port number on the sender host (and/or destination host) associated to the TCP connection and to a same "source port" (and/or "destination port") correspond payloads exchanged between the hub apparatus 20 and a same terminal 10.

The wireless connection identifiers (such as for example the "source port" and/or "destination port") are an example of association information that the mobile terminal 10 can transmit to the hub apparatus 20, to place the speaker identifier in association with the video stream transmitted by a same mobile terminal. The hub apparatus 20 is thus capable of placing the current speaker indicator in association with the video stream originating from a same mobile terminal 10.

In particular, the association information allows the hub apparatus 20 to establish, indirectly (for example through the "source port") or directly (for example through the "destination port") which among the plurality of video streams and among the plurality of current speaker indicators received from the plurality of mobile terminals 10a-10d were sent from a same mobile terminal 10.

The association information is not limited to the example above and its meaning should be constructed as comprising any type of information that may allow to establish a direct or indirect association or relation between a current speaker indicator and a video stream. In particular, the association information can be represented by an identification number determined by the hub apparatus 20 and assigned to the video stream and to the current speaker indicator by the mobile terminal 10, following a negotiation between the hub apparatus 20 and the various mobile terminals 10a-10d. Alternatively, such association information can be a univocal identifier of the mobile terminal 10 determined by the mobile terminal 10 itself. Furthermore, the association information can also be represented by characteristics of the communication channel used by the mobile terminal 10 to communicate with the hub apparatus 20, for example the frequency used for transmitting the information.

However, as it will be apparent to the person skilled in the art, other types of channels, and other methods for establishing a univocal correspondence between the video stream and current speaker indicator are also possible.

The formats supported for the video stream exchanged between the mobile terminal 10 and the hub apparatus 20 may include, without being limited to: 4:3 and 16:9: 1920x1080 (Full HD) 1280x720 (720p), 640x360 (360p), 800x600, 640x480, 320x240, 768x576, 352x288. The codifications supported for the transmission of the video stream between the mobile terminal 10 and the hub apparatus 20 may include, but are not limited to: H264, H265, MJPEG, WP8, WP9.

Figure 3:
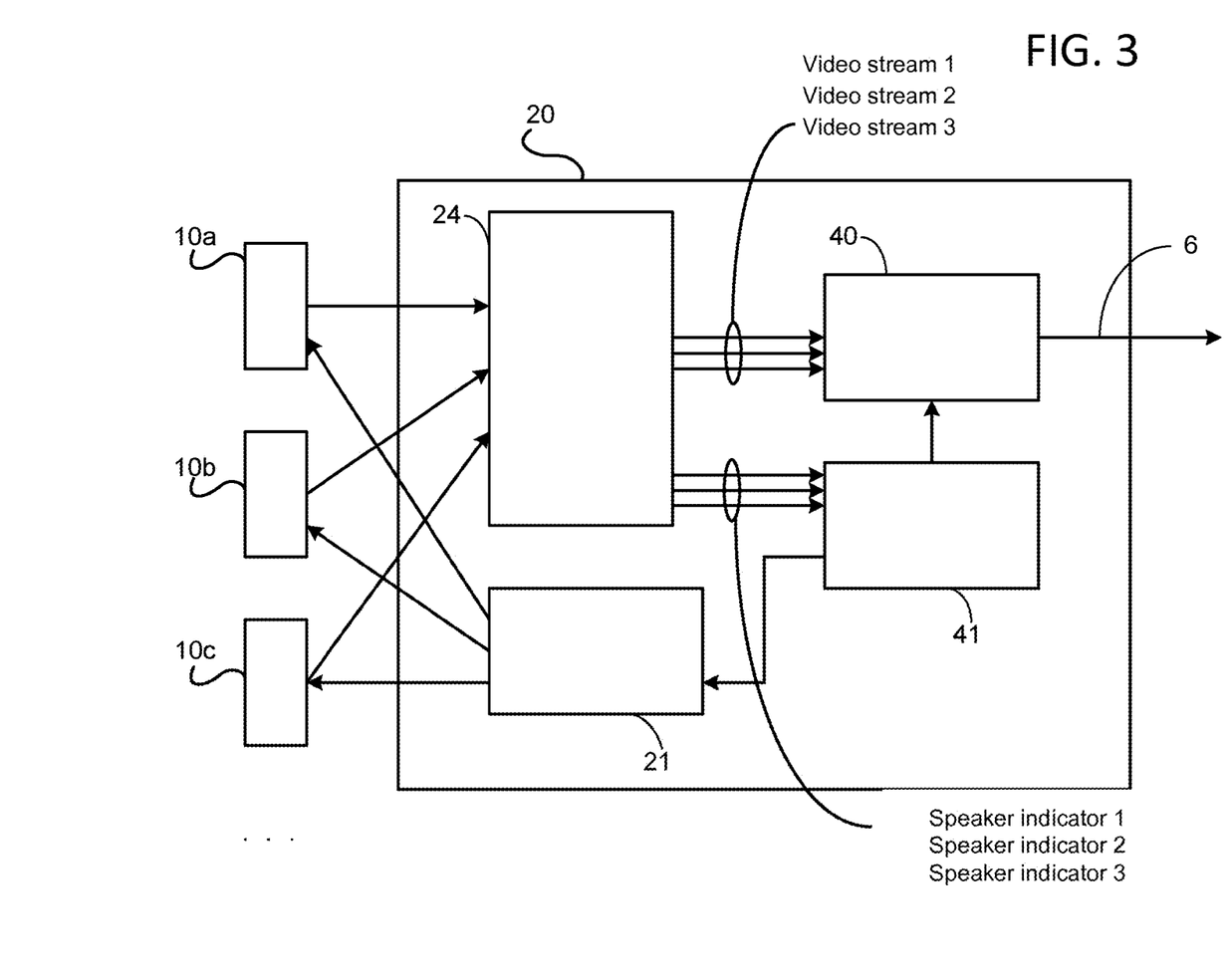
FIG. 3 illustrates a hub apparatus according to an embodiment of the invention.

Now, with reference to FIG. 3, the hub apparatus 20 schematically includes a receiving unit 24, a generation unit 40 and current speaker establishing unit 41, both operatively connected to the receiving unit 24. Optionally, the hub apparatus 20 may also include a timing unit 21.

The hub apparatus 20 could be centralised and located in a technical room of the infrastructure of a company network. In this case, the devices can be connected to the company network (for example by means of an "access point") and they can reach the hub apparatus 20 through said company network. Alternatively, the hub apparatus 20 could be located in a special designated space, for example a conference room of the company, and the mobile terminals 10 could be directly connected to the hub apparatus 20, for example by means of a dedicated wireless connection.

The receiving unit 24 is configured to receive from each mobile terminal 10 of the plurality of mobile terminals 10a-10d the video stream and the current speaker indicator, besides the association information. The receiving unit 24 provides the respective current speaker indicators to the current speaker establishing unit 41. Furthermore, the receiving unit 24 is configured to provide the video streams to the generation unit 40. Optionally, the receiving unit 24 may be configured to receive audio streams from the mobile terminals. Alternatively, the hub apparatus 20 could be provided with its own audio acquisition means (not shown in the figure), enabled to function in particular when all mobile terminals 10 and the terminal 30 are located in the same room.

The current speaker establishing unit 41 is operatively connected to the receiving unit 24 and receives from the receiving unit 24 an information stream regarding each current speaker indicator of each mobile terminal 10 of the plurality of mobile terminals 10a-10d. The current speaker establishing unit 41 is configured for repeatedly selecting, according to pre-established selection criteria, a current speaker indicator, among a plurality of current speaker indicators repeatedly received, and for providing it to the generation unit 40.

The selection criteria used by the current speaker establishing unit 41 can, for example, include the comparison of the various current speaker indicators. For example, the current speaker establishing unit 41 may determine which among the various current speaker indicators (e.g. correlation parameters) has the greatest value, select such current speaker indicator (correlation parameter) and provide it to the generation unit 40. The current speaker establishing unit 41 could also take into account the previously identified current speaker for selecting the new current speaker based on the most recent speaker indicators.

Alternatively, the current speaker establishing unit 41 may provide the generation unit 40 with an information based on the same selected current speaker indicator, but different from the selected current speaker indicator. For example, the current speaker establishing unit 41 may provide the generation unit 40 with a connection identifier corresponding to the video stream of the speaker, that is, an identifier of the wireless connection through which the selected speaker indicator was sent. For example, in case of a TCP connection, the port number associated to the TCP channel (or connection) relative to the selected current speaker indicator can be transmitted from the current speaker establishing unit 41 to the generation unit 40. More generally, the current speaker establishing unit 41 may provide an identifier of a video stream, usable by the generation unit 40 for selecting a video stream among those received by the receiving unit 24.

The generation unit 40 is configured for selecting a video stream among all video streams received from the plurality of mobile terminals 10 based on the information received from the current speaker establishing unit 41, for example, based on the current speaker indicator or based on a wireless connection identifier.

The generation unit 40 is also configured to generate a single output video communication stream 6 based on the plurality of video streams received through the receiving unit 24 and based on the selected video stream.

The single output video communication stream 6 generated by the generation unit 40 may comprise a patchwork of one or more video images. Each of the video images of the video images stream is generated using one of the video streams received from each of the mobile terminals 10.

The patchwork may be generated so that the video image generated using the selected video stream is distinguishable (or marked) with respect to the other video images generated using the other video streams.

Figure 4:
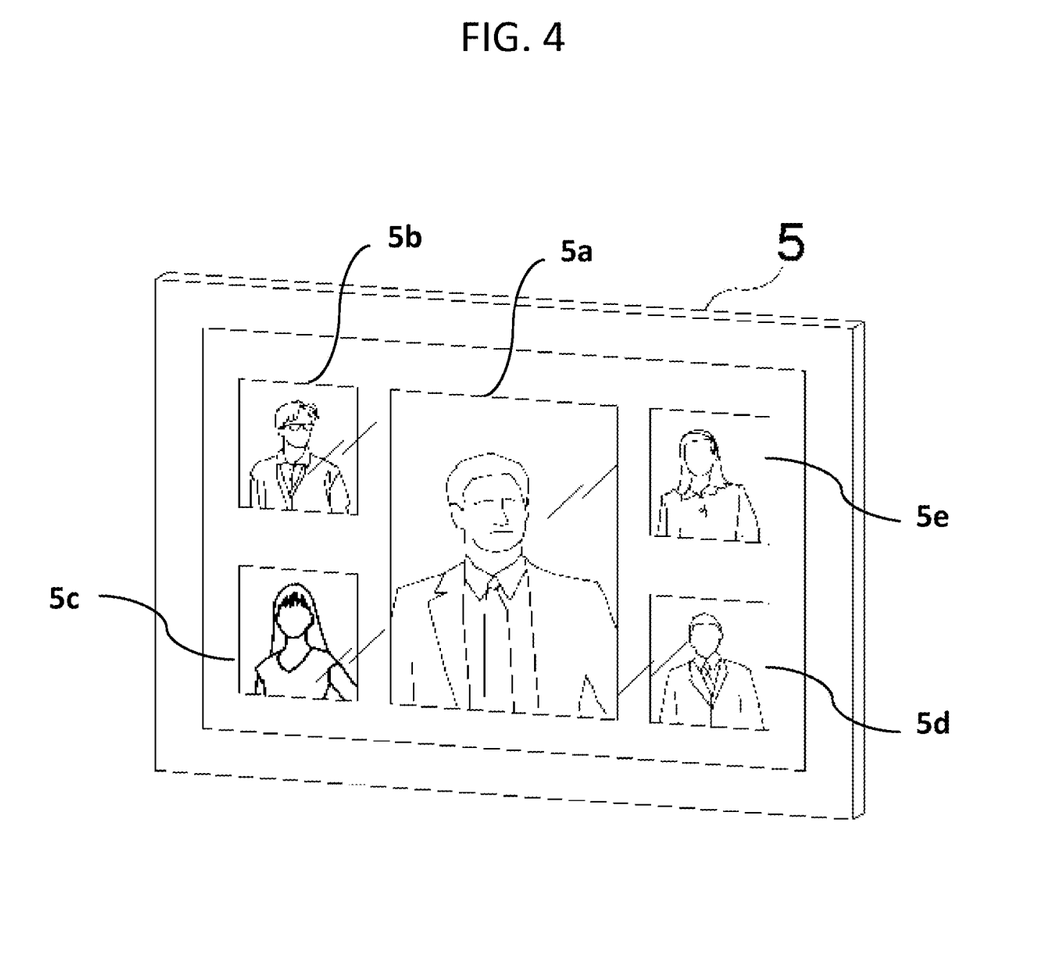
FIG. 4 illustrates an example of the video generated by the hub apparatus by composing video streams received from the plurality of mobile terminals.

Such distinction can take the form of a visual distinction: for example, and with reference to FIG. 4, when the video images stream is reproduced by a specific reproduction unit (for example a screen or a display of a mobile terminal located at a remote site, for example at the terminal 32 in FIG. 1), the video image generated using the selected video stream 5a is enlarged, i.e. it is reproduced using a larger number of pixels of the screen, with respect to the other video images generated using video streams different from the selected video stream 5b, 5c, 5d, 5e.

Other forms of distinction, suitable to provide visual indications on the video image generated using the selected video stream, are obviously possible and will be well known to the person skilled in the art.

Such forms of distinction may include, for example, without being limited to: presence of a blinking or coloured frame surrounding the video image, increasing luminous intensity in comparison to the other video images (or, by way of contrast, reducing the relative luminous intensity of the other video images), close-up effect (or, by way of contrast, a background effect of the other images). According to a further embodiment, the single output video stream 6 could also only relate to the video stream of the identified speaker.

In other words, the generation unit 40 of the hub apparatus may be configured to carry out at least one of the following operations:
  generating the video image by using the selected video stream in a predetermined position in the patchwork;
  creating a patchwork only containing the video image generated using the selected video stream;
  marking the video image generated using the selected video stream differently with respect to the other videos generated from the non-selected video streams;
  forming the video image by using the selected video stream with a greater dimension with respect to the other video images generated using the other video streams.

in this way, various methods can be used to indicate the current speaker and for better drawing the attention of the participants to the video call/video conference.

According to a further aspect of the present invention, the hub apparatus 20 can be provided with a synchronisation system for managing the generation and the timed sending of the correlation parameters of the various mobile terminals 10.

In particular, the hub apparatus 20 can optionally include a timing unit 21, configured to transmit a timing signal to each of the mobile terminals of the plurality of mobile terminals 10. Such signal can be collectively sent to all mobile terminals 10 and may include timing information indicating the pace at which the current speaker indicator must be generated by the processing unit 60 of the mobile terminal 10 and subsequently sent to the hub 20.

For example, such timing information can indicate to the processing unit 60 that the current speaker indicator must be generated repeatedly, for example periodically and with a constant period comprised between 0.3 and 3 seconds; in particular, such constant repetition period can be comprised between 0.5 and 2 seconds. However, the repetition period may also be non-constant over time. In other words, the processing unit 60 can be configured to repeatedly generate the current speaker indicator with a repetition period fixed or variable over time, based on the timing information provided by the hub apparatus 20.

In an embodiment, the timing signal may include a clock signal which, when received at the mobile terminal 10, actuates the processing to generate the speaker indicator by means of the processing unit 60. The processing unit 60 of the mobile terminal 10 may thus be configured to start the generation of the current speaker indicator based on the timing information.

The generation unit 40 may optionally be configured to generate the single output video communication stream 6 based on the current speaker indicators received from each mobile terminal 10 exclusively within a predetermined time window W and relating to timing information included in the timing signal. In this case, the generation unit 40 can also be configured to generate the output video communication stream 6 as soon as the time period defined by the time window W elapses.

For example, the time window W can be defined starting from the period indicated by the timing information. By way of example, the window may be defined as a percentage of the period (or of the non-periodic time span, in case of non-cyclic timing) defined by the timing information included in the timing signal and it may be defined a priori by the hub apparatus 20, for example at the initial stage of the video call/video conference, or it may be adapted based on the needs during the video call/video conference. Such percentage may for example be a 10%, 20%, 30%, 40% or 50% of the period T defined by the timing information.

Figure 5:
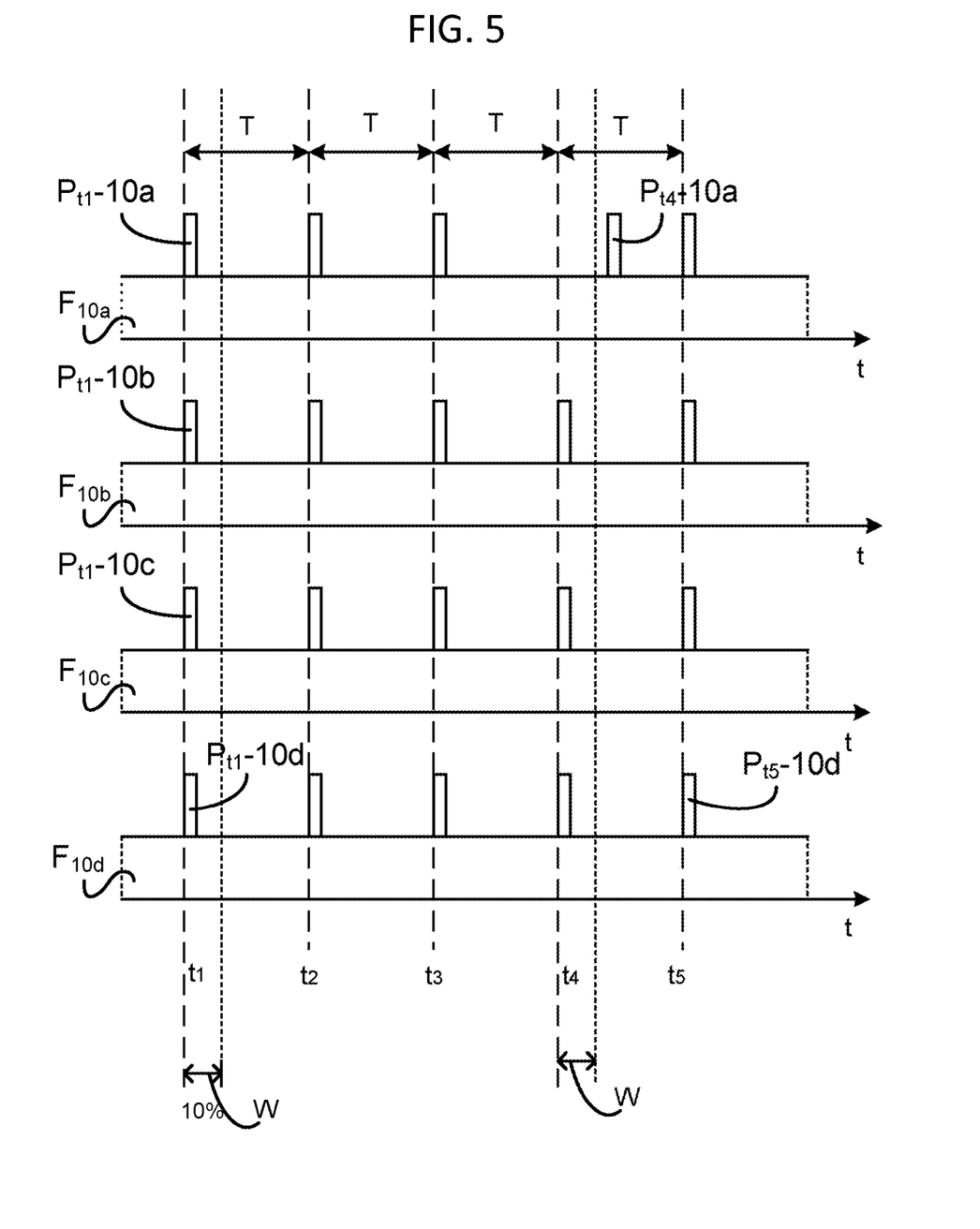
FIG. 5 shows an example of timing of the sending of the speaker indicator by several mobile terminals connected to the same hub apparatus.

FIG. 5 shows an example of the timing for the sending of the speaker indicators by several mobile terminals 10a-10d connected to the same hub apparatus 20.

In order to improve the clarity of description, the time span between the sending of a given correlation parameter by one of the mobile terminals, and the receipt thereof by the hub terminal 20 can be ignored in the following discussion. Still for the sake of clarity purposed, hereinafter it is assumed that the current speaker indicator is generated and immediately sent by the respective mobile terminals.

FIG. 5 shows exemplarily the case where the current speaker indicator is generated, and thus sent and received by the hub apparatus 20, periodically with period T, and in which a time window W, with amplitude equivalent to 10% of the period T defined starting from an instant identified by the timing information, was set. Furthermore, the example shows four video streams $F_{10a}$, $F_{10b}$, $F_{10c}$ and $F_{10d}$ generated by four mobile terminals 10a, 10b, 10c and 10d connected to the hub apparatus 20.

As regards the time instant $t_1$, the single output video stream 6, comprising the patchwork of several video images, is generated based on all current speaker indicators $P_{t1}$-10a, $P_{t1}$-10b, $P_{t1}$-10c, $P_{t1}$-10d, relative to the four mobile terminals 10a-10b connected to the hub apparatus 20, given that all current speaker indicators were generated (and thus sent and received by the hub apparatus 20) within the predetermined time window W.

Otherwise, at the time instant $t_4$, the current speaker indicator $P_{t4}$-10a regarding the mobile terminal 10a is not generated (and thus sent and received) within the time window W, so that such indicator is not considered when generating the single output stream 6.

In order to avoid delays when creating the output video communication stream 6, or in order to prevent the output video communication stream 6 from not being generated at all in correspondence to a given time instant, the generation unit 40 can be configured to create the output video communication stream 6 even though not all current speaker indicators regarding all user terminals have been received. For example, the generation unit 40 may be configured to assign a default value to the current speaker indicator of a given mobile terminal 10, if this is not received within the time window W. Such default value, when expressed as a correlation parameter, i.e. as a probability, may for example be 0%. In other words, the generation unit 40 can be configured to assume that, in absence of a received correlation parameter, the user of the mobile terminal 10 in question is not speaking.

Being able of generating the patchwork even in the absence of the current speaker indicator relative to a user, may bring about the advantage of preventing the quality of the video conference/video call from being negatively affected by the technical difficulties of a single connected device. Such technical difficulties may for example include poor connection, or slow connection, or processing capacity of the mobile terminal 10 insufficient to generate the correlation parameter at the frequency required by the hub apparatus 20.

The timing information and the parameters deriving therefrom (such as the time window W for example), may be the result of an active negotiation between the hub apparatus 20 and each of the single mobile terminals 10a-10d.

One of the mobile terminals, for example the mobile terminal 10a, could inform the hub apparatus 20, by means of a timing feedback signal, that it is not capable of generating the correlation parameter at the frequency (or within the time span) initially requested by the hub apparatus 20. In this case, the mobile terminal 10 might provide to the hub apparatus 20, and in particular to the timing unit 21, information regarding its processing capacity, or regarding a generation frequency compatible with its processing capacity.

Following the receipt of such information from the mobile terminal 10, the timing unit 21 of the hub apparatus 20 may send again updated timing information to all user terminals 10, taking into account the information regarding the frequency or processing capacity indicated by the mobile terminal 10a.

Furthermore, the hub apparatus 20 could be configured to request the mobile terminals 10 to provide the current speaker indicators at decreasing time intervals. In this case, the hub apparatus 20 could be configured to progressively and automatically reduce the duration of the time intervals until one of the mobile terminals 10 signals—by means of the timing feedback—that it is not able of providing the timing parameter within the required time span. In this way, it is possible to find the minimum time span within which all mobile terminals are able to provide the timing information.

Figure 6:
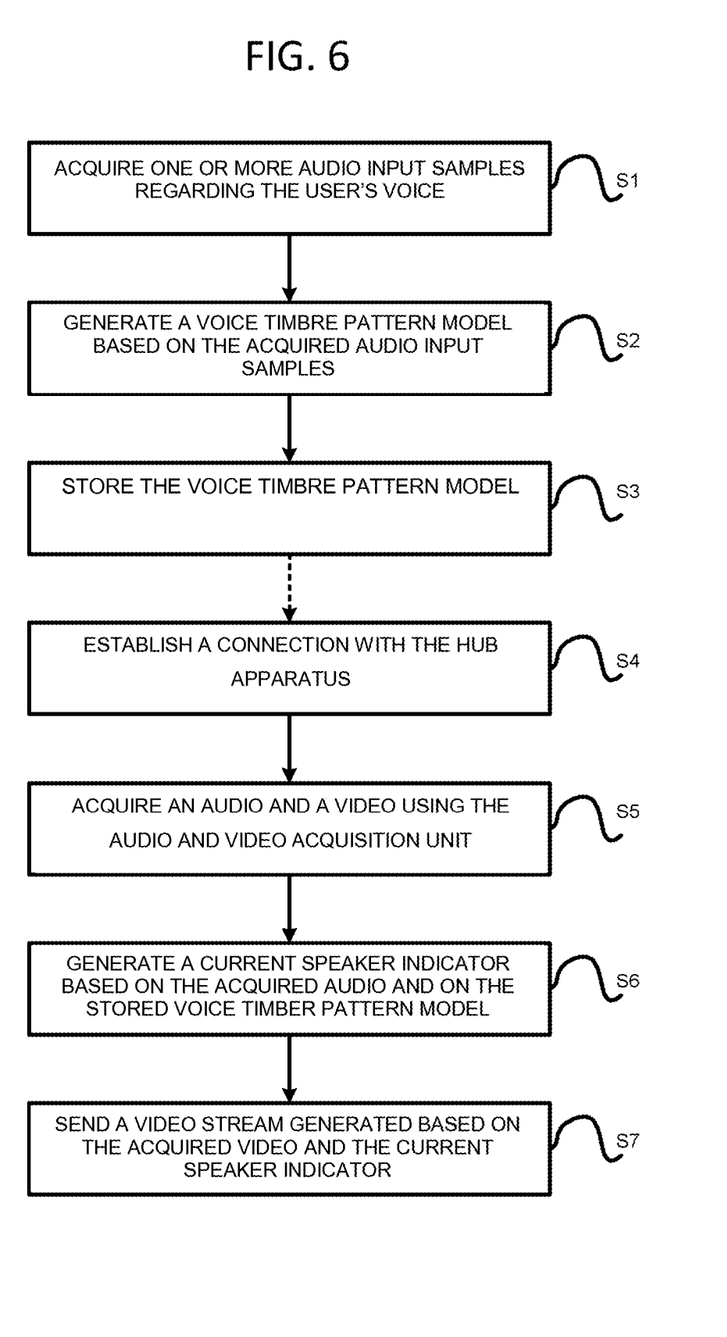
FIG. 6 shows a block diagram of the operations carried out by the mobile terminal to set the voice timbre pattern model and take part in the video conference.

FIG. 6 describes a method, according to the present disclosure, regarding the video communication carried out by a video communication system comprising the hub apparatus 20 and the plurality of mobile terminals 10 wirelessly connected to the hub apparatus 20.

Firstly, one or more audio input samples regarding the voice of a user are acquired at step S1.

Based on the acquired audio samples, a voice timbre pattern model is generated during step S2 and is subsequently stored in the storage 50 in step S3. All the modalities previously described for the storage of the voice timbre pattern model in the storage 50 can be used in the present method.

Steps S1-S3 can be carried out even in the absence of a connection of the mobile terminal 10 to the hub apparatus 20, prior to the commencement of the video conference. Steps S1-S3 represent an initialisation step which may occur once and for all and may not need to be repeated for each video conference.

A connection with the hub apparatus 20 is established in step S4, in case it was not already previously established.

In step S5, during the video conference, audio signals and video signals are acquired by means of the audio acquisition unit 12 and the video acquisition unit 11.

Furthermore, the method comprises the step S6 of generating a current speaker indicator based on the acquired audio signal and based on the voice timbre pattern model stored in the storage.

Lastly, in step S7 a video stream (optionally with an audio stream) is sent to the hub apparatus 20 based on the acquired video signal and, in addition, the current speaker indicator is sent to the hub apparatus 20. The speaker indicator is associated to a video stream by means of association information. Steps S6-S7 are repeated with a fixed or variable period during the video conference, so as to provide to the hub apparatus 20 a speaker indicator always updated.

The description outlined above regarding an embodiment applying the innovative principles of the invention is provided solely with the aim of exemplifying such principles and thus shall not be understood to limit the scope of patent protection claimed herein.

The embodiments described above may be subjected to various modifications and they will be apparent to the person skilled in the art.

Alternative Embodiments

For example, even though in the embodiments described above the generation unit 40 of the hub apparatus is configured to select a video stream from among those received from the mobile terminals 10a-10d having the largest correlation parameter, in a variant of the invention the generation unit of the hub apparatus can be configured to select a video stream from among those received from the mobile terminals having the smallest correlation parameter. In this case, a value relatively close to 0% of the correlation parameter is indicative of a relatively high correspondence level between the voice timbre stored in the storage 50 and the voice timbre extracted starting from the input audio signal. On the contrary, a relatively large value of the correlation parameter is indicative of a relatively poor correspondence level between the voice timbre stored in the storage 50 and the voice timbre extracted starting from the input audio signal.

In a preferred embodiment, each mobile terminal 10 is associated to a single timbre. Nevertheless, according to another alternative embodiment, the storage 50 may contain information relating to several voice timbres of several users, such as for example, information regarding two or more users using the same mobile terminal 10. According to this embodiment, it is possible that only a portion or the entirety of the information present in the storage 50 be employed for a particular use upon request by at least one of the users.

User's requests (request to partly use the information in the storage 50 and request to update the information in the storage 50) may be tasked once the user selects a special command from the mobile terminal 10, before, after or during a video call/video conference.

In case the storage contains information relating to several voice timbres, the current speaker indicator can include various parameters, for example as many correlation parameters as the number of voice timbres stored in the storage 50. Alternatively, the current speaker indicator can be an integrated indicator indicative of the possibility that the voice timbre extracted from the input audio signal be attributable to at least one of the voice timbres or voice timbre pattern models stored in the memory 50.

Having information on different voice timbres in the storage 50 meets the needs that a same mobile terminal 10 be used by more than one user, or that two or more users take part in a video conference using the same mobile terminal 10.

In the description of the hub apparatus 20, reference was made to various units, such as for example the receiving unit 24, the generation unit 40, the current speaker establishing unit 41 and the timing unit 21, each one of which carries out a specific task. However, as it will be clearly apparent to a man skilled in the art, a different, larger or smaller, number of units can carry out the described tasks without departing from the teachings of the present disclosure. For example, it is possible that all the tasks be carried out by only one unit, or that the same task be carried out by two or more units. Furthermore, the hub apparatus 20 and the mobile terminals 10 are made of hardware components that execute a software for performing the functions described above. Such hardware and software implementations can be easily imagined by the man skilled in the art. In particular, the hardware includes at least one processor and a memory on which the program code (software) is stored, the device (hub apparatus 20 or mobile terminal 10) carries out the functions described above upon executing it.

According to another aspect of the present disclosure, after sending a first timing signal, the hub apparatus 20 can be configured to generate a second timing signal based on the timing feedbacks received from each of the mobile terminals of the plurality of mobile terminals in response to the first timing signal. In this case, each timing feedback is indicative, for example of the processing capacity of the respective mobile terminal 10 and preferably at least one timing feedback indicates that the time span is too short with respect to the processing capacity of the respective mobile terminal 10. Alternatively, at least one timing feedback indicates that the time span is too long with respect to the processing capacity of the respective mobile terminal 10.

According to another aspect of the present disclosure, the generation unit 40 can optionally be configured for generating the output video communication stream 6 even based on computer vision techniques as well as based on the current speaker indicators. In particular, computer vision techniques (managed on the hub apparatus) could be provided alongside the ones described in the present disclosure with the aim of improving the identification of the current speaker further. An example of computer vision technique includes the analysis of the lip movement in a portion of the video image representing the face of a party taking part in the conference.

According to further embodiments, the hub apparatus 20 could be embodied as a software module carried out on a standard server or on a generic hardware, for example a server connectable locally with the mobile terminals taking part in the conference.

Figure 7:
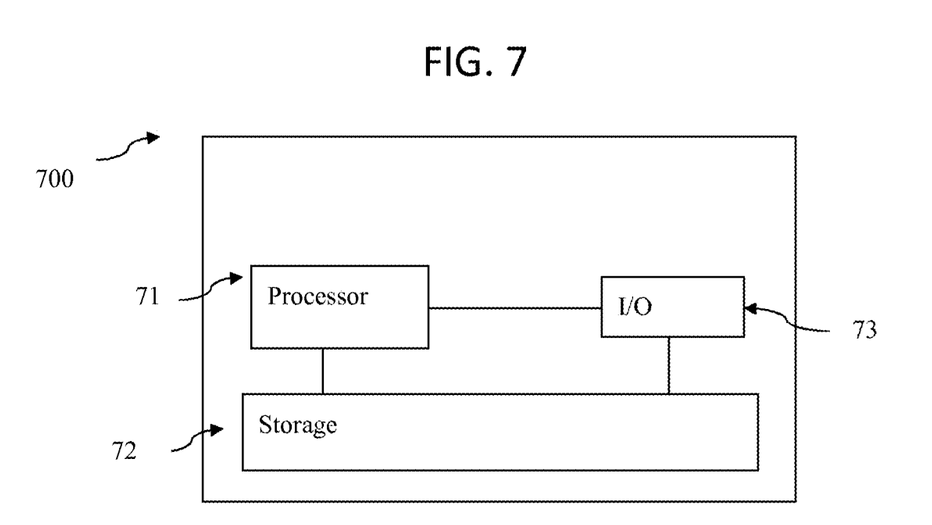
FIG. 7 illustrates a schematic representation of a hardware structure of the hub apparatus and/or mobile terminal according to the present disclosure.

FIG. 7 shows a schematic representation for an hardware structure 700 that may be used for implementing one or more of the above-described devices, that is the mobile terminal 10 and/or the hub apparatus 20. The hardware structure 700 may include one or more processors 71 and one or more storage device 72 (or memory). The processor 71 may control the data writing and data reading operation to and from the storage 72 in each appropriate manner. Processor 71 may, for example, generate the above described signals (for instance, timing signals) and/or it may elaborate said signals. In particular, when executing a program stored in the storage device 72, the processor 71 may carry out all, or some, of the above functionalities described with reference to, for instance, the generation unit 40 and/or the current speaker establishing unit 41 (for the case of the hub apparatus 20) or with reference to the video stream generation unit 13 and/or the processing unit 60 (for the case of the mobile terminal 10).

The hardware structure 700 may also include an input/output module 73 for receiving and/or transmitting signals. In particular, under the control of the processor 71, the input/output module 73 may carry out all, or some, of the functionalities described above with reference to, for instance, the video acquisition unit 11 and/or the audio acquisition unit 12 (for the case of the mobile terminal 10), or with reference to the receiving unit 24 and/or the timing unit 21 (for the case of the hub apparatus 20). However, also other possible implementations of the mobile terminal 10 and of the hub apparatus 20 can be envisaged. For example, a distributed implementation including a plurality of devices could be employed for implementing the hub apparatus 20.

The invention claimed is:

1. A mobile terminal comprising:
  a transmission unit configured to transmit to a hub a video stream generated from an input video signal, and wherein a timing parameter is received from the hub indicating a frequency interval of how frequently a current speaker indicator must be repeatedly generated;
  a storage configured to store a voice timbre pattern model of a user of the mobile terminal;
  a processing unit configured to generate a current speaker indicator indicating whether the user of the mobile terminal is speaking, the current speaker indicator being generated on the basis of an input audio signal and the voice timbre pattern model stored in the storage; and
  wherein the transmission unit is configured to transmit to the hub, a current speaker indicator in accordance with the frequency interval and an association information which associates the current speaker indicator to the video stream, and wherein the processing unit is configured to extract a voice timbre pattern model from the input audio signal to calculate a correlation parameter percentage value based on a probability of similarity between the extracted voice timbre pattern model and the voice timbre pattern model stored in the storage of the mobile terminal, and wherein the current speaker indicator is generated based on the correlation parameter and is indicative of the probability that the user of the mobile terminal is speaking.

2. A mobile terminal according to claim 1, wherein said transmission unit is configured to establish a wireless connection with the hub to transmit the video stream and the current speaker indicator to the hub via a wireless connection.

3. A mobile terminal according to claim 2, wherein the association information comprises an identifier of the wireless connection.

4. The mobile terminal according to claim 1, wherein the processing unit is configured to repeatedly generate the current speaker indicator with a fixed or variable period of repetition.

5. The mobile terminal according to claim 1, wherein the mobile terminal is configured to receive a timing signal from the hub including timing information, wherein the processing unit is configured to generate the current speaker indicator on the basis of the timing information.

6. A hub apparatus comprising:
a receiving unit configured to receive from each mobile terminal of a plurality of mobile terminals, a video stream, a current speaker indicator indicating whether the user of each mobile terminal is speaking and an association information which associates the current speaker indicator transmitted by each mobile terminal to the video stream transmitted from the mobile terminal and wherein the current speaker indicator received from each mobile terminal is generated by each mobile terminal and received by the receiving unit according to a frequency interval specified by a timing parameter sent from the hub to each mobile terminal,
a generation unit operatively connected to the receiving unit and configured to generate an output video communication stream based on the plurality of video streams received from the plurality of mobile terminals, on the plurality of current speaker indicators received from each mobile terminal of the plurality of mobile terminals and on the plurality of association information received from the plurality of mobile terminals, and
a processing unit configured to extract a voice timbre pattern model from an input audio signal to calculate a correlation parameter percentage value based on a probability of similarity between the extracted voice timbre pattern model and a voice timbre pattern model stored in the storage of one or more of the mobile terminals, and wherein the current speaker indicator is generated based on the correlation parameter and is indicative of the probability that one or more of the users of the mobile terminals is speaking.

7. The hub apparatus according to claim 6, further comprising:
a timing unit configured to transmit a timing signal to each of the plurality of mobile terminals providing information on a time span within which the transmission unit of each of the plurality of mobile terminals has to transmit the current speaker indicator to the hub apparatus.

8. The hub apparatus according to claim 7, wherein the generation unit is configured to generate the output video communication stream on the basis of current speaker indicators received from each of the plurality of mobile terminals exclusively within a pre-established time window (W) related to timing information included in the timing signal.

9. The hub apparatus according to any claim 6, wherein the generation unit is configured to select one video stream among all video streams transmitted by the plurality of mobile terminals based on the plurality of current speaker indicators, wherein each of the current speaker indicators expresses the probability that the users of the respective mobile terminals are speaking.

10. The hub apparatus according to claim 9, wherein the generation unit is configured to output the video communication stream including a combination of one or more video images each one of which are generated by using one of the video streams received from the terminal devices, wherein the video image generated using the selected video stream is marked with respect to the other video images generated using the other video streams.

11. The hub apparatus according to claim 6, wherein the hub apparatus is configured to establish a wireless connection with each mobile terminal of the plurality of mobile terminals, and receive the video stream and the current speaker indicator of a mobile terminal via the same wireless connection with the mobile terminal, and the association information comprising identifiers of the wireless connection.

12. A method comprising:
generating an input video signal;
generating an input audio signal;
transmitting to a hub an output video stream generated based on the input video signal generated;
storing a voice timbre pattern model of a user of the terminal device;
generating a current speaker indicator indicating whether the user of the mobile terminal is speaking, the current speaker indicator being generated based on the input audio signal generated and the stored voice timbre pattern model, and wherein a timing parameter received from the hub indicates a frequency interval of how frequently a current speaker indicator must be repeatedly generated;
transmitting, while transmitting the video stream, the current speaker indicator in accordance with the frequency interval to the hub and an association information relating the current speaker indicator to the video stream;
receiving from each mobile terminal the video stream, the current speaker indicator and the association information;
generating an output video communication stream based on the plurality of video streams received from each of the plurality of mobile terminals, the plurality of current speaker indicators received from each of the plurality of mobile terminals, and the plurality of association information received from each of the plurality of mobile terminals, and wherein the processing unit is configured to extract the voice timbre pattern model from the input audio signal to calculate a correlation parameter percentage value based on a probability of similarity between the extracted voice timbre pattern model and a voice timbre pattern model stored in storage of the one or more mobile terminals, and wherein the current speaker indicator is generated based on the correlation parameter and is indicative of the probability that the user of the one or more mobile terminals is speaking.

\* \* \* \* \*